UNITED STATES PATENT OFFICE.

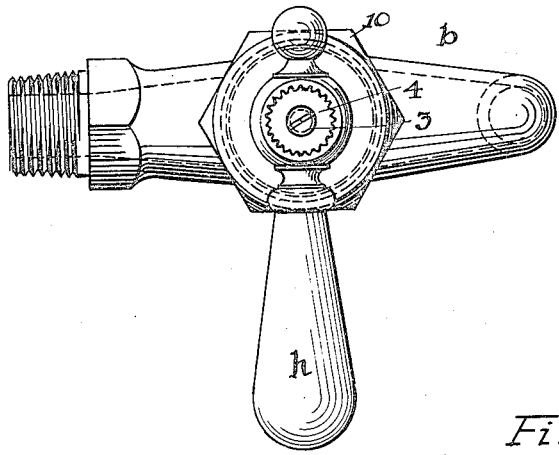
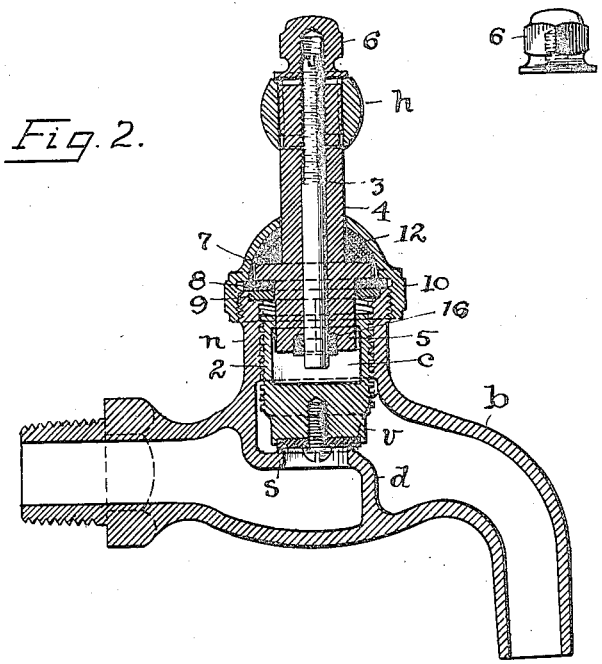

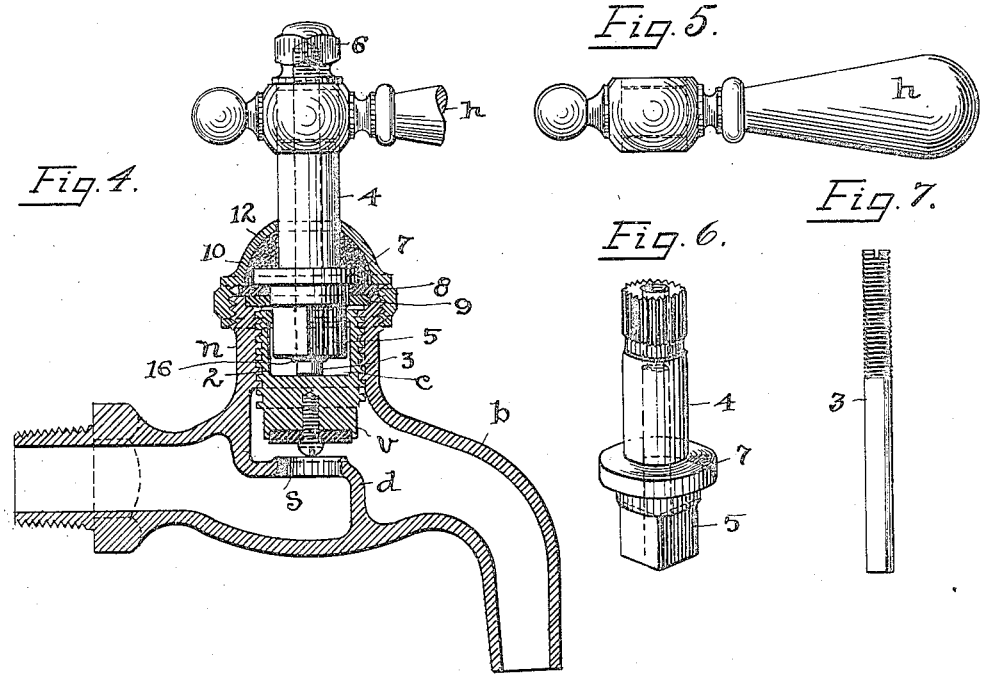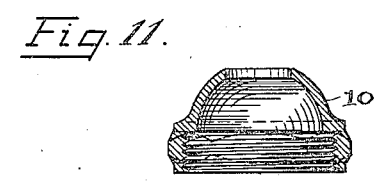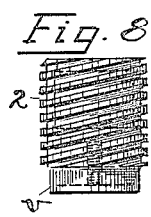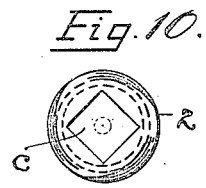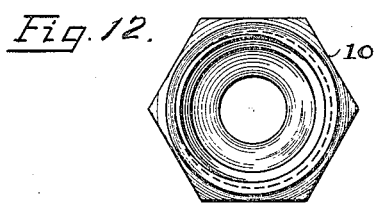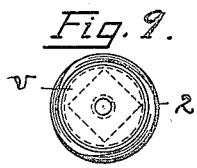

WILLIAM S. VALMORE, OF LAKEWOOD, OHIO, ASSIGNOR TO UNITED BRASS MANUFACTURING COMPANY, A PARTNERSHIP COMPOSED OF WILLIAM J. SCHOENBERGER AND BENJAMIN F. KLEIN.

QUICK-COMPRESSION FAUCET.

1,169,306.   Specification of Letters Patent.   Patented Jan. 25, 1916.

Application filed May 9, 1914. Serial No. 837,448.

*To all whom it may concern:*

Be it known that I, WILLIAM S. VALMORE, citizen of the United States, residing at Lakewood, in the county of Cuyahoga and State of Ohio, have invented certain new and useful Improvements in Quick-Compression Faucets, of which the following is a specification.

This invention relates to quick-compression faucets, and the invention consists in the construction and combination of parts, substantially as shown and described and particularly pointed out in the claims.

The object of the invention is to provide a faucet with means to adjustably fix the degree of rotative movement of the valve stem and handle, and to govern the extent to which the valve may be opened, and the present invention affords a convenient arrangement to obtain such adjustment without dismantling the faucet.

In the accompanying drawings, Figure 1 is a plan view of the faucet with the handle and valve in closed position, and Fig. 2 is a sectional elevation of Fig. 1. Fig. 3 is a detail of the cap nut on the stem of the faucet. Fig. 4 is a sectional elevation of the faucet showing the valve open. Fig. 5 is a detail of the handle. Fig. 6 is a perspective view of the valve stem. Fig. 7 is a detail of the screw bolt which occupies the stem and serves to fix the limit to which the valve may be opened. Figs. 8, 9 and 10 are side, bottom and top views of the triple threaded valve plunger or member 2, and Figs. 11 and 12 are detail views of the packing nut.

The faucet comprises a body $b$ of any preferred pattern which has the usual seats $s$ in the diaphragm $d$ for the valve $v$. The neck $n$ is provided with an internal quick or triple thread, and the upper portion of the valve comprising a plunger or member 2 is threaded externally to screw into said neck and is the element immediately relied upon to effect a quick maximum opening of the valve with the minimum of rotary movement, or from the closed position as seen in Fig. 2 to the open position as seen in Fig. 4. Such rotary movement is accomplished as shown herein by a quarter turn of handle $h$, or, say from the closed position in Figs. 1 and 2 to the open position in Fig. 4. Practically, the valve $v$ constitutes a portion of the plunger 2 and is so regarded herein, but a separate valve as such might be affixed to the plunger.

The terms "maximum" and "minimum" as employed herein are relative and dependent and do not necessarily imply the same measure of movement or position always of the valve member. In fact the invention is designed to change the degree of rotative movement of the valve stem and handle and the distance to which the said member may be raised according to the size of opening wanted for the valve, and this is accomplished by means of a screw bolt or rod 3 which passes axially through the valve stem or shaft 4 and is of greater length than the shaft, so as to possibly expose both ends at the same time beyond the ends of said shaft. To this end the said valve stem or shaft 4 is threaded in its upper portion to engage the thread on screw bolt 3, and the lower end of said shaft has a square or equivalently fashioned head 5 adapted to enter and slidably engage a correspondingly-shaped cavity $c$ in the top of said valve member and serve as a medium for rotating the same on its external thread in the faucet body.

When the parts are assembled the head 5 projects into said cavity and the degree of movement of the valve member upward to open the valve is determined by the depth to which the screw bolt 3 projects beneath said head opposite the bottom of the cavity $c$. In brief, the distance to which the valve may be raised or opened is variably fixed by bolt 3, and the cap nut 6 on the upper end of the said stem or screw bolt 3 fixes the same in any position of adjustment on the principle of a lock nut, the said nut also serving to confine the handle in place. The valve stem or shaft 4 is firmly held against up and down play by a collar 7 near its inner end which rests on a packing ring or gasket 8 over a metallic ring 9 seated in the top of the neck $n$ of the faucet body, and by the packing nut 10 which is sleeved over the valve stem and screwed upon the outside of the said neck about the top thereof with the packing 12 in seating and sealing relation upon collar 7. This arrangement permits absolute sealing effects and affords a means of tightly clamping the valve stem in place without necessarily affecting fixed adjustments of the screw bolt 3, and there are no parts within the neck to interfere with the fullest desired upward movement of the valve member to open the valve to its maximum as indicated in Fig. 2.

The head of the handle or lever *h* is milled or serrated axially in its bore to match the serrations on the valve stem 4, which provides for a delicate adjustment rotarily of the handle to fix its stop position relatively to the body when the valve is closed. Thus, suppose the valve to be seated as in Figs. 1 and 2. When in this position it is desirable to have the handle at right angles to the body of the faucet or at one side. The handle is accordingly placed over the serrated end of the shaft at right angles to the faucet body and it is thus interlocked rotarily with the valve. Then a quarter turn only of the handle will place the handle in axial alinement with the body, and the quick thread on the valve plunger 2 will open the valve to practically the full capacity of the faucet. The screw bolt 3 serves to limit the upward movement of the valve and to stop the handle when in line with the faucet, and by removing cap nut 6 the kerf of the bolt 3 may be engaged by a screw driver to turn the bolt so that its lower end bears hard against the bottom of the cavity in the plunger 2, Fig. 4. When the desired relationship of parts is established the valve stem or shaft 4 cannot be rotated further in the opening direction nor the valve raised higher, and the limits of movement of the valve are definitely determined in this way. Of course the extent of opening can be altered at any time by adjusting the screw bolt 3 up or down. Indeed the valve can be locked against any movement whatever from its seat by means of this bolt, and the bolt can be withdrawn far enough to permit the valve member to run to its highest limit on its threads and thus give something more than a quarter turn to handle *h*.

A ring packing 16 seated about the inner end of bolt 3 in a recess in the head of the shaft 4 prevents possible leakage in this direction.

What I claim is:

1. A faucet having a screw threaded valv member with a cavity in its top, a rotatable shaft having an extremity slidably engaged in said cavity, a screw threaded bolt projected through said shaft and adjustable therein to serve as a stop for said valve member, a handle removably mountel on the outer end of said shaft and a cap nu. to lock said bolt and handle jointly in fixed position upon said shaft.

2. A faucet body and an externally threaded valve member adjustable in said body and having an angular cavity in its top, a rotatable shaft having an angular extremity slidably engaged in said cavity and a packing nut sleeved upon said shaft and in engaging relation with said body above said valve, in combination with a screw threaded bolt projecting through said shaft at both ends and adjustable to limit the opening of said valve, a handle on said shaft and means to fasten said handle and said bolt jointly in fixed position on said shaft.

In testimony whereof I affix my signature in presence of two witnesses.

WILLIAM S. VALMORE.

Witnesses:
 HELEN HYNES,
 M. FITZGERALD.